United States Patent
Harding, Jr. et al.

(10) Patent No.: US 10,558,364 B2
(45) Date of Patent: Feb. 11, 2020

(54) MEMORY ALLOCATION IN A DATA ANALYTICS SYSTEM

(71) Applicant: Alteryx, Inc., Irvine, CA (US)

(72) Inventors: Edward P. Harding, Jr., Boulder, CO (US); Adam David Riley, Orwell (GB); Christopher H. Kingsley, Longmont, CO (US)

(73) Assignee: Alteryx, Inc., Irvine, CA (US)

( * ) Notice: Subject to any disclaimer, the term of this patent is extended or adjusted under 35 U.S.C. 154(b) by 17 days.

(21) Appl. No.: 15/785,353

(22) Filed: Oct. 16, 2017

(65) Prior Publication Data

US 2019/0114085 A1    Apr. 18, 2019

(51) Int. Cl.
  *G06F 3/06*  (2006.01)
  *G06F 12/08*  (2016.01)

(52) U.S. Cl.
  CPC ............ *G06F 3/0608* (2013.01); *G06F 3/064* (2013.01); *G06F 3/065* (2013.01); *G06F 3/067* (2013.01); *G06F 3/0631* (2013.01); *G06F 3/0655* (2013.01); *G06F 3/0679* (2013.01); *G06F 3/0685* (2013.01); *G06F 12/08* (2013.01)

(58) Field of Classification Search
  None
  See application file for complete search history.

(56) References Cited

U.S. PATENT DOCUMENTS

| | | | |
|---|---|---|---|
| 5,832,310 A | 11/1998 | Morrissey et al. | |
| 5,875,454 A | 2/1999 | Craft et al. | |
| 6,564,274 B1 | 5/2003 | Heath et al. | |
| 6,606,704 B1 | 8/2003 | Adiletta et al. | |
| 6,625,671 B1 | 9/2003 | Collette et al. | |
| 8,880,481 B1 | 11/2014 | Harada et al. | |
| 9,183,200 B1 | 11/2015 | Liu et al. | |
| 9,436,558 B1 | 9/2016 | Per et al. | |
| 2005/0008011 A1 | 1/2005 | Georgiou et al. | |
| 2005/0071579 A1 | 3/2005 | Luick | |

(Continued)

OTHER PUBLICATIONS

PCT International Search Report and Written Opinion, PCT Application No. PCT/US18/32557, dated Jul. 27, 2018, eight pages.

(Continued)

*Primary Examiner* — Charles Rones
*Assistant Examiner* — Ryan Dare
(74) *Attorney, Agent, or Firm* — Fenwick & West LLP

(57) ABSTRACT

A module manages memory in a computer. The module monitors usage of a primary memory associated with the computer. The primary memory stores memory blocks in a ready state. In response to primary memory usage by the memory blocks in the ready state exceeding a ready state threshold, the module compresses at least some of the memory blocks in the ready state to form memory blocks in a ready and compressed state. In response to primary memory usage by the memory blocks in the ready and compressed state exceeding a release threshold, the module releases at least some of the memory blocks in the ready and compressed state. In response to primary memory usage by the memory blocks in the compressed state exceeding a compressed threshold, the module transfers at least some memory blocks in the compressed state to a secondary memory associated with the computer.

20 Claims, 7 Drawing Sheets

(56) References Cited

U.S. PATENT DOCUMENTS

| | | |
|---|---|---|
| 2006/0217834 A1* | 9/2006 | Shotwell ............... G06F 3/0608 |
| | | 700/213 |
| 2009/0144304 A1 | 6/2009 | Stephens et al. |
| 2010/0115182 A1 | 5/2010 | Murugesan |
| 2012/0166752 A1* | 6/2012 | Taniyama ............. G06F 3/0664 |
| | | 711/170 |
| 2013/0138628 A1 | 5/2013 | Bensberg et al. |
| 2013/0339473 A1 | 12/2013 | McCaffrey et al. |
| 2014/0297652 A1 | 10/2014 | Stevens et al. |
| 2014/0337314 A1 | 11/2014 | Potapov et al. |
| 2015/0113535 A1 | 4/2015 | Goda et al. |
| 2016/0147450 A1 | 5/2016 | Derby et al. |
| 2016/0378752 A1 | 12/2016 | Anderson et al. |
| 2017/0103016 A1 | 4/2017 | Stalzer |
| 2018/0246657 A1* | 8/2018 | Sadowski ............... G06F 3/068 |

OTHER PUBLICATIONS

PCT International Search Report and Written Opinion, PCT Application No. PCT/US2018/042257, dated Sep. 21, 2018, 11 pages.
PCT International Search Report and Written Opinion, PCT Application No. PCT/US18/55890, dated Dec. 7, 2018, nine pages.
PCT International Search Report and Written Opinion, PCT Application No. PCT/US18/55898, dated Dec. 26, 2018, nine pages.

\* cited by examiner

MEMORY ALLOCATION IN A DATA ANALYTICS SYSTEM

BACKGROUND

Field of Art

The described embodiments pertain in general to computer memory management, and in particular to allocating memory while processing large amounts of data.

Description of the Related Art

The growth of data analytic platforms, such as Big Data Analytics, has expanded data processing into a tool for processing large volumes of data to extract information having business value. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computer devices.

In addition, efficient data processing techniques are needed to access, process, and analyze the large sets of data from differing data sources. Otherwise, performance bottlenecks can occur and impede the function of the data analytics platform, delay the processing of the data, and reduce the quality of information extracted from the data. For example, one or more processors in the platform may be unable to process the data in a timely manner, leading to delays as other subsystems in the platform wait for output from the processors. In another example, the amount of data being processed may exceed the size of the working memory available to the platform. In this latter example, delays may occur as data are transferred to and from the memory.

SUMMARY

The above and other issues are addressed by a method, computer system, and computer-readable storage medium for managing memory in a computer. An embodiment of the method includes monitoring usage of a primary memory associated with the computer, the primary memory storing memory blocks in a ready state. The method further includes in response to primary memory usage by the memory blocks in the ready state exceeding a ready state threshold, compressing at least some of the memory blocks in the ready state to form memory blocks in a ready and compressed state and memory blocks in a compressed state. The method further includes in response to primary memory usage by the memory blocks in the ready and compressed state exceeding a release threshold, releasing at least some of the memory blocks in the ready and compressed state. The method also includes in response to primary memory usage by the memory blocks in the compressed state exceeding a compressed threshold, transferring at least some memory blocks in the compressed state to a secondary memory associated with the computer to form memory blocks in an on-disk state.

An embodiment of the computer system includes a computer processor for executing computer program instructions. The system also includes a non-transitory computer-readable storage medium storing computer program instructions that when executed cause a computer processor to perform steps. The steps include monitoring usage of a primary memory associated with the computer, the primary memory storing memory blocks in a ready state. The steps further include in response to primary memory usage by the memory blocks in the ready state exceeding a ready state threshold, compressing at least some of the memory blocks in the ready state to form memory blocks in a ready and compressed state and memory blocks in a compressed state. The steps further include in response to primary memory usage by the memory blocks in the ready and compressed state exceeding a release threshold, releasing at least some of the memory blocks in the ready and compressed state. The steps also include in response to primary memory usage by the memory blocks in the compressed state exceeding a compressed threshold, transferring at least some memory blocks in the compressed state to a secondary memory associated with the computer to form memory blocks in an on-disk state.

An embodiment of the non-transitory computer-readable storage medium stores executable computer program instructions. The instructions are executable to monitor usage of a primary memory associated with the computer, the primary memory storing memory blocks in a ready state. The instructions are further executable to compress at least some of the memory blocks in the ready state to form memory blocks in a ready and compressed state and memory blocks in a compressed state, in response to primary memory usage by the memory blocks in the ready state exceeding a ready state threshold. The instructions additionally release at least some of the memory blocks in the ready and compressed state, in response to primary memory usage by the memory blocks in the ready and compressed state exceeding a release threshold. The instructions also in response to primary memory usage by the memory blocks in the compressed state exceeding a compressed threshold, transfer at least some memory blocks in the compressed state to a secondary memory associated with the computer to form memory blocks in an on-disk state.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
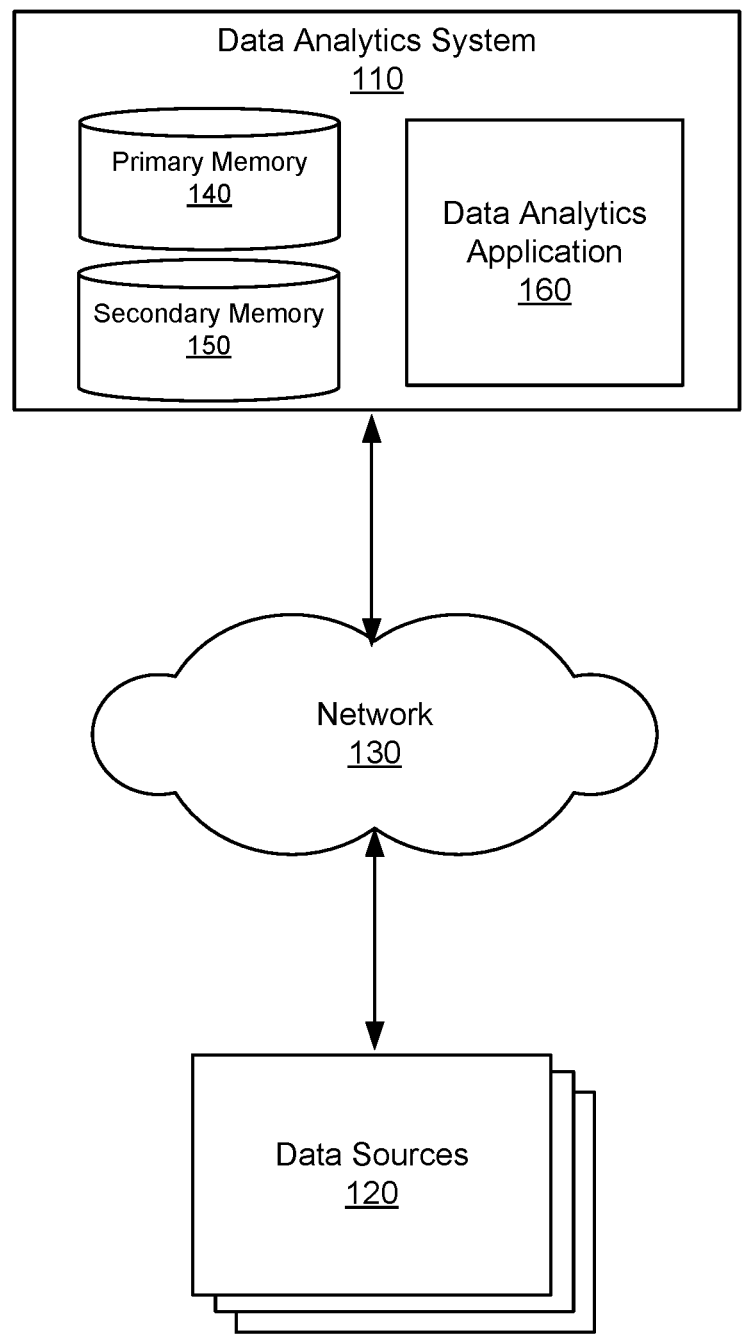
FIG. 1 is a block diagram illustrating a data analytics environment including a data analytics system according to one embodiment.

FIG. 1 is a block diagram illustrating a data analytics environment 100 including a data analytics system 110 according to one embodiment. The environment 100 further includes multiple data sources 120 connected to the data analytics system 110 via a network 130. Although the illustrated environment 100 contains only one data analytics system 110 coupled to multiple data sources 120, embodiments can have multiple data analytics systems and a singular data source.

The data analytics system 110 is a computer-based system utilized for processing and analyzing large amounts of data. The data are collected, gathered, or otherwise accessed from the multiple data sources 120 via the network 130. The data analytics system 110 can implement scalable software tools and hardware resources employed in accessing, preparing, blending, and analyzing data from a wide variety of data sources. For instance, the data analytics system 110 supports the execution of data intensive processes and workflows. The data analytics system 110 can be a computing device used to implement data analytics functions including the memory management techniques described herein.

The data analytics system 110 can also be configured to support one or more software applications, illustrated in FIG. 1 as a data analytics application 160. The data analytics application 160 processes and analyzes large amounts of data obtained from one or more of the data sources 120. In some cases, the data analytics application 160 provides software that supports networked, or cloud-based, access to data analytic tools and macros to multiple end users. As an example, the data analytics application 160 allows users to share, browse and consume analytics in a manner similar to a mobile application store or other cloud-based service. Analytic data, macros and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics application 160 can perform functions associated with analytic apps such as creating, deploying, publishing, iterating, updating and the like.

Additionally, the data analytics application 160 can support functions performed at various stages involved in data analytics, such as the ability to access, prepare, blend, analyze, and output analytic results. In some cases, the data analytics application 160 can access the various data sources, retrieving raw data, for example, in a stream of data. Data streams collected by the data analytics application 160 can include multiple records of raw data, where the raw data is in differing formats and structures. After receiving at least one data stream, the data analytics application 160 can perform operations to allow records of the data stream to be used as an input into data analytic operations. Moreover, analytic functions involved in statistic, qualitative, or quantitative processing of records, such as predictive analytics (e.g., predictive modelling, clustering, data investigation) can be implemented by data analytics application 160.

The data analytics application 160 can also support a software tool to design and execute repeatable workflows, via a visual graphical user interface (GUI). As an example, a GUI associated with the data analytics application 160 offers a drag-and-drop workflow environment for data blending, data processing, and advanced data analytics. Moreover, a workflow can include a series of data processing tools that perform specific processing operations or data analytics functions. Each tool that is part of a workflow performs a function related to data that is specific to the tool. As an example, a workflow can include tools implementing various data analytics functions including one or more of the following: input/output; preparation; join; predictive; spatial; investigation; and parse and transform operations. More details about workflow are described in conjunction with FIG. 2.

In the embodiment of FIG. 1, the data analytics system 110 includes a primary memory 140 and a secondary memory 150. In some embodiments, the primary memory 140 provides relatively fast access to a relatively small data storage area, while the secondary memory 150 provides relatively slow access to a relatively large data storage area (where "relative" refers to the differences between the primary and secondary memories). For example, the primary memory 140 may include a portion of random access memory (RAM), e.g., 16 GB, available on the data analytics system 110. The secondary memory 150, in contrast, may include portions of storage devices such as hard disk drives (HDDs) and/or solid-state drives (SSDs) in communication with the data analytics system 110 that can store terabytes of data.

In an embodiment, the data analytics application 160 allocates usage of the primary and secondary memories to provide efficient processing of the data from the data sources 120 according to a specified workflow. For example, the data being processing may exceed the amount of storage space available in the primary memory 140. In addition, the speed at which the secondary memory 150 can supply data may be slower than the rate at which the tools within the data analytics application 160 can consume the data. The data analytics application 160 addresses these issues by performing memory management of the primary 140 and secondary 150 memories in a manner that optimizes the rate at which data are supplied to the tools. As such, the memory management improves performance of the data analytics application 160, as well as the data analytics system 110.

As mentioned above, the data sources 120 provide electronic data to the data analytics system 110. A data source 120 may be a computer, a database, or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130. The data provided the data sources 120 is typically organized into data records, which each data record including one or more values. For example, a data record provided by a data source may include a series of comma-separated values. The data describes information of relevance to an enterprise using the data analytics system. For example, data from a data source 120 can describe computer-based interactions (e.g., click tracking data) with content accessible on websites and/or with social media applications.

The network 130 represents the communication pathways between the data analytics system 110 and the data sources 120. In one embodiment, the network 130 is the Internet and uses standard communications technologies and/or protocols. The data exchanged over the network 130 can be represented using technologies and/or formats including the hypertext markup language (HTML), the extensible markup language (XML), etc. In another embodiment, the entities can use custom and/or dedicated data communications technologies instead of, or in addition to, the ones described above.

Figure 2:
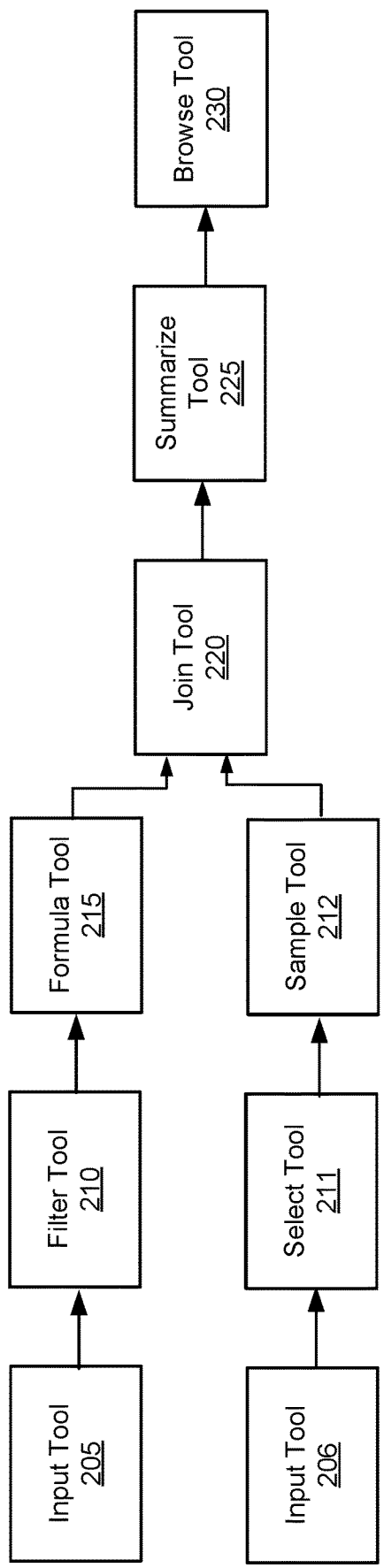
FIG. 2 is a block diagram illustrating a workflow created using the data analytics system to process data according to one embodiment.

FIG. 2 is a block diagram illustrating a workflow 200 created using the data analytics system 110 to process data according to one embodiment. In one embodiment, the workflow 200 is created using a visual workflow environment supported by a GUI of the data analytics system 110. The visual workflow environment enables a set of drag and drop tools that eliminate the need of providing software code to design a workflow and eliminate the need to identify complex formulas to be implemented by a workflow. In another embodiment, the workflow 200 is created and described in a document, such as an extensible markup language (XML) document. The workflow 200 is executed by a computer device of the data analytics system 110. However, in other embodiments, the workflow 200 is deployed to another computer device that may be communicatively connected, via a network (e.g., the network 130), to the data analytics system 110.

A workflow can include a series of tools that perform specific processing operations or data analytics functions. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. A record, including an aggregated group of individual records, can be passed through the tools of a workflow, which allows for the individual processing operations to operate more efficiently on the data. Such data aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools can execute in parallel.

As illustrated, the workflow 200 of FIG. 2 includes input/output tools, illustrated as input tools 205 and 206 and browse tool 230. The input tools 205 and 206 function to access records from particular data sources 120. The inputs tools 205 and 206 bring into the workflow the accessed records and provide the records to the subsequent tools of the workflow 200. In this example, the input tool 205 provides accessed records to a filter tool 210 and the input tool 206 provides accessed records to a select tool 211. The browse tool 230 is located at the end of the workflow 200 and receives the output resulting from the execution of each of the upstream tools of the workflow 200. Although the browse tool 230 is located at the end of the workflow 200 in this example, the browse tool 230 can be added at any point in a workflow to review and verify results from execution of upstream tools of the workflow.

In continuing with the example of FIG. 2, the workflow 200 includes preparations tools, shown as the filter tool 210, the select tool 211, a formula tool 215, and a sample tool 212. The filter tool 210 queries records based on an expression and splits the data into two streams, a true stream that includes records that satisfy the expression and a false stream that includes records that do not satisfy the expression. The select tool 211 can be used to select, deselect, reorder and rename fields, change field type or size, and assign a description. The formula tool 215 creates or updates fields using one or more expressions to perform a broad variety of calculations and/or operations. The sample tool 212 limits a received stream of records to a number, percentage, or random set of records.

The workflow 200 also includes a join tool 220 that blends multiple data sources. Specifically, the join tool 220 combines two input data streams based on common fields (or record position). The workflow 200 of FIG. 2 is also shown to include a summarize tool 225 which is a parse and transform tool that can restructure and re-shape data to a format used in further analysis. The summarize tool 225 can also perform summarization of data by grouping, summing, counting, spatial processing, and string concatenation. In one embodiment, the output generated by the summarize tool 225 contains the results of the calculation(s).

In some embodiments, execution of the workflow 200 will cause the input tool 205 to pass records one at a time through the filter tool 210 and the formula tool 215, until all records are processed and have reached the join tool 220. Thereafter, the input tool 206 will begin passing records one at a time through the select tool 211 and sample tool 212, until the records are passed to the same join tool 220. Some individual tools of the workflow 200 can possess the capability to implement their own parallel operation, such as initiating a read of a block of data while processing the last block of data or breaking computer-intensive operations, such as a sort tool, into multiple parts. However, in some existing workflow techniques, each record from a set of records is individually processed by each tool of the workflow one record at a time, in a pipeline fashion, until a tool in the workflow is reached that requires multiple records to perform the processing operation (e.g., sort tool, join tool, summarize tool, etc.).

Figure 3:
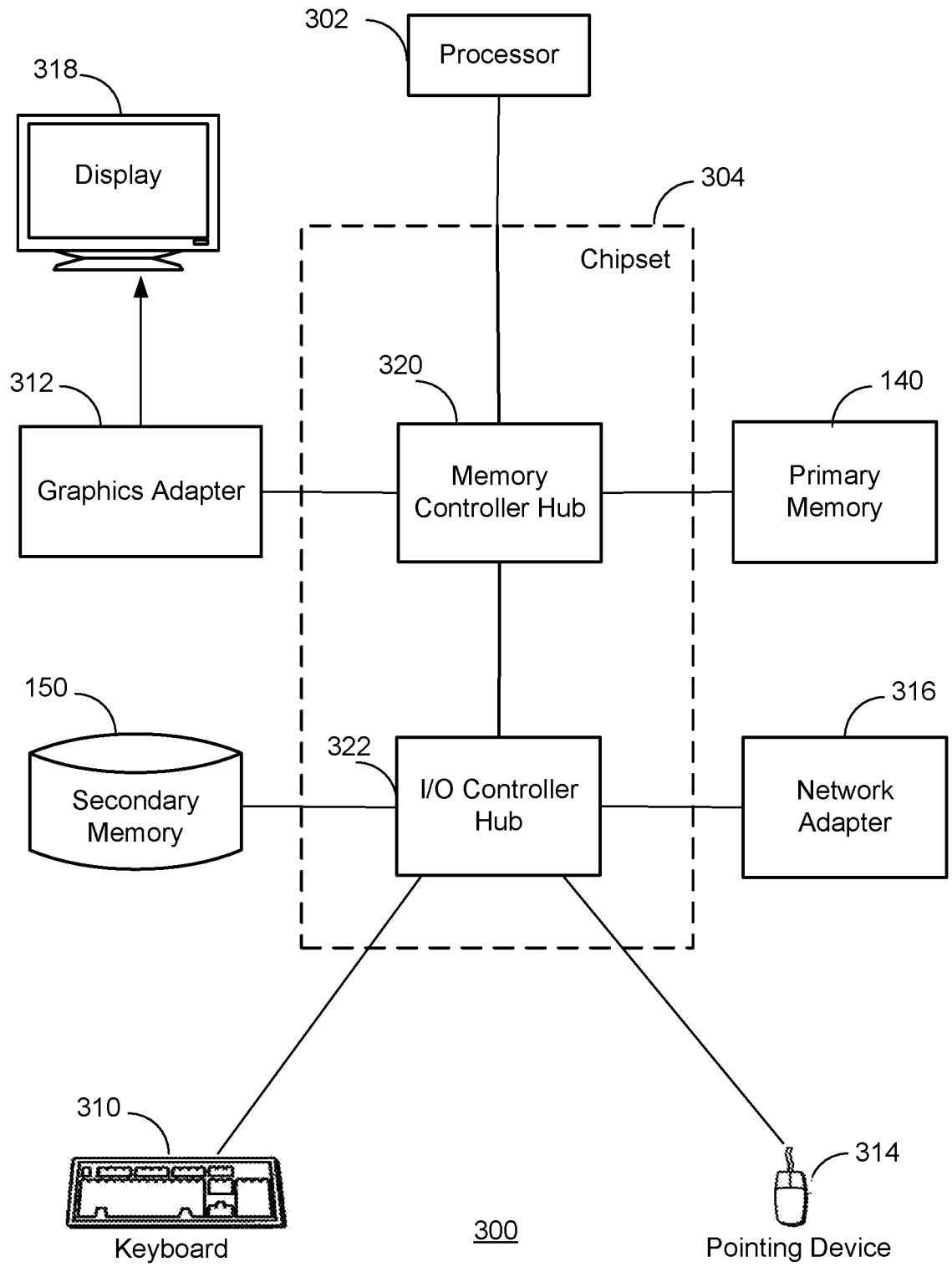
FIG. 3 is a high-level block diagram illustrating a functional view of a typical computer system for use as the data analytics system of FIG. 1 according to one embodiment.

FIG. 3 is a high-level block diagram illustrating a functional view of a typical computer system 300 for use as the data analytics system 110 of FIG. 1 according to an embodiment. The computer system 300 can execute the data analytics application 160 to implement the workflow of FIG. 2.

The illustrated computer system 300 includes at least one processor 302 coupled to a chipset 304. The processor 302 can include multiple processor cores on the same die. Also coupled to the chipset 304 are the primary memory 140, the secondary memory 150, a keyboard 310, a graphics adapter 312, a pointing device 314, and a network adapter 316. A display 318 is coupled to the graphics adapter 312. In one embodiment, the functionality of the chipset 304 is provided by a memory controller hub 320 and an I/O controller hub 322. The network adapter 316 couples the computer system 300 to the network 130.

In some embodiments, the computer system 300 may have additional, fewer, or different components and the components may be coupled differently. For example, embodiments of the computer system 300 may lack displays and/or keyboards. As another example, the computer system 300 may have multiple primary 140 and/or secondary 150 memories. In addition, the computer system 300 may be instantiated as a rack-mounted blade server or as a cloud server instance in some embodiments.

The primary memory 140 is a non-transitory computer-readable storage medium and holds instructions and data used by the processor 302. In some embodiments, the primary memory 140 is a random-access memory. The amount of time required for a data access is relatively short.

Hence, it is advantageous to store data that is being accessed by the processor, or that is likely to be accessed in the near term, within the primary memory 140.

The secondary memory 150 is likewise a non-transitory computer-readable storage medium that holds instructions and data used by the processor 302. The secondary memory stores data in data blocks, referred to herein as "secondary data blocks," which are accessed as a unit. Secondary data block sizes vary depending upon the size of the secondary memory 150 and may range from 1 KB to 8 KB.

Depending upon the embodiment, the secondary memory 150 may support random access or sequential access to secondary data blocks (e.g., depending upon whether the secondary memory is a HDD or SSD). Accordingly, the time required for a data access involving the secondary memory 150 may vary depending upon the location being accessed. At any rate, the amount of time required for a data access involving the secondary memory 150 is greater than the amount of time required for an equivalent access involving the primary memory 140. Hence, it is detrimental to the performance of the computer system 300 to store data that is being accessed by the processor, or that is likely to be accessed in the near term, within the secondary memory 150.

The computer system 300 includes a limited amount of the primary memory 140. For example, the system 300 may include 16 or 32 GB of primary memory. However, the computer system 300 includes an effectively unlimited amount of the secondary memory 150. For example, the system may include hundreds of gigabytes or terabytes of secondary memory. Typically, the amount of data being processed by the data analytics system 110 exceeds the capacity of the primary memory 140. Therefore, at least some of the data are stored in the secondary memory 150. The data are moved between the primary 140 and secondary 150 memories as the data passes through the workflow.

The computer system 300 is adapted to execute computer program modules for providing the functionality described herein. As used herein, the term "module" refers to computer program instructions and other logic for providing a specified functionality. A module can be implemented in hardware, firmware, and/or software. A module can be executed as a process. In addition, a module can be executed as one or more threads within a process. A module is typically stored on the secondary memory 308, loaded into the primary memory 306, and executed by the processor 302.

Figure 4:
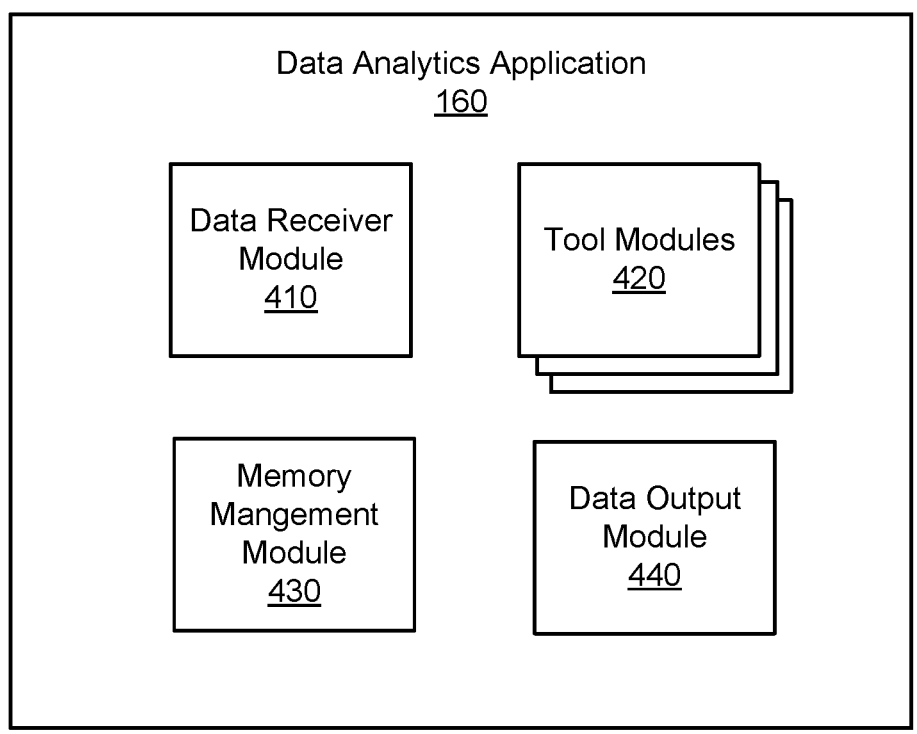
FIG. 4 is a block diagram illustrating a more detailed view of the data analytics application of the data analytics system according to one embodiment.

FIG. 4 is a block diagram illustrating a more detailed view of the data analytics application 160 of the data analytics system 110 according to one embodiment. The analytics application 160 includes a data receiver module 410, tool modules 420, a memory management module 430, and a data serving module 440. Those of skill in the art will recognize that other embodiments can have different and/or other components than the ones described here, and that the functionalities can be distributed among the components in a different manner.

The data receiver module 410 receives the data records from the data sources 120 and provides the data records to other modules in the data analytics application 160. In one embodiment, the data receiver module 410 serves as the interface between the tools in the data analytics application, such as the input tools 206 illustrated in FIG. 2. In another embodiment, the data receiver module 410 is absent and the function of the data receiver module 410 is performed by the tools.

The tool modules 420 provide a set of data processing tools that perform specific processing operations or data analytics functions including one or more of the following: input/output; preparation; join; predictive; spatial; investigation; and parse and transform operations. The tools operate on the data records received from the data sources 120 by the data receiver module 410. The tool modules 420 provide the tools included in the workflow 200 described in conjunction with FIG. 2.

In one embodiment, one or more of the tool modules 420 may execute in parallel while processing data records for a workflow. Such a tool module may run as multiple separate threads, with each thread operating on a separate core of the processor 302. For example, an embodiment of the join tool distributes tasks associated with the join operation to multiple threads to leverage the parallel processing capabilities of the processor 302.

Further, the tools provided by the tool modules 420 use memory to store the data records being processed within the workflow. The tool modules 420 interact with the memory management module 430 to allocate the memory for use during processing, and to release the memory once processing is completed. Some tools may use memory in certain patterns while processing data. For example, the join tool typically processes data records using multiple passes. Such tools typically allocate a large amount of memory to store the data records being processed, access each data record once during a first pass, and then access each data record again during a subsequent pass.

The memory management module 430 manages memory usage by the data analytics application 160. In one embodiment, the memory management module 430 is dedicated to the data analytics application 160. The memory management module 430 may separately interface with memory management functionality provided by the data analytics system 110. For example, the memory management module 430 may interface with a different memory management system provided by an operating system running on the data analytics system 110. The memory management module 430 abstracts the memory operations of the data analytics application 160 away from the operating system memory management system.

To this end, the memory management module 430 allocates and releases memory for storing data records being processed by the tools of the tool modules 420 as the tools implement a workflow. In addition, the memory management module 430 selectively stores the allocated memory in either primary 140 or secondary 150 memory. Generally, the memory management module 430 stores data records that are currently being accessed by the tools in the primary memory 140 and stores data records that are not currently being accessed by the tools in the secondary memory 150. The memory management 430 moves data records between the primary 140 and secondary 150 memories as the records are accessed by the tools. In addition, the memory management module 430 selectively compresses data records in the primary memory 140 in order to effectively use the limited storage capacity of the primary memory 140.

In one embodiment, the tools provide notices to the memory management module 430 indicating when the tools are likely to access memory blocks containing the data records. For example, a tool may provide a notice indicating whether it is likely to access a particular block within a short or long duration. In addition, a notice may tell the memory management module 430 when a tool intends to access a block again and when it has completely finished accessing a block. For example, a notice may tell the memory management module 430 when a tool has temporarily finished accessing a block, but will access the block again in the future. A notice may also tell the memory management module 430 when a tool will not access a block again.

The memory management module 430 can use the notices from the tools when deciding whether to store particular memory blocks in the primary 140 and secondary memories 150, and the state (e.g., ready, compressed) in which to store the blocks. The memory management module 430 can also use the notices to determine when to release (e.g., recycle) particular blocks. Further, in one embodiment the memory management module 430 uses the notices to maintain several counts describing the number of tools accessing particular blocks. The memory management module 430 maintains an access count indicating the number of tools that are currently accessing a block and a lock count indicating the number of tools may access a block in the future. When the lock count reaches zero, the memory management module 430 can release the block.

The memory management module 430 thus enhances the performance of the data analytics system 110 and data analytics application 160 by storing records being accessed by the tools of the tool modules 420 in the relatively faster primary memory 140. In particular, the memory management module 430 enhances the performance of tools, such as the join tool, that perform multiple passes across a large number of data records.

The data output module 440 outputs the results of the processing performed by the data analytics application 160. That is, the data output module 440 receives the processed data records produced by execution of the workflow 200 and makes the data records available to other systems and/or human reviewers. For example, the data output module 440 may provide a GUI by which a human reviewer associated with an enterprise can review the output of the workflow 200 resulting from processing data records associated with the enterprise.

Figure 5:
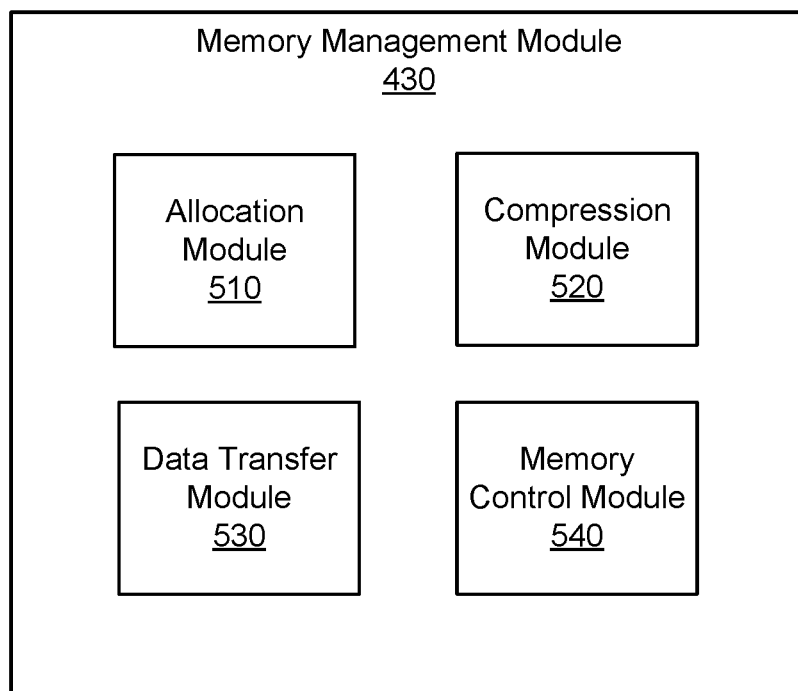
FIG. 5 is a block diagram illustrating a more detailed view of the memory management module according to one embodiment.

FIG. 5 is a block diagram illustrating a more detailed view of the memory management module 430 according to one embodiment. The memory management module 430 includes an allocation module 510, a compression module 520, a data transfer module 530, and a memory control module 540. Other embodiments can have different and/or other components than the ones described here, and that the functionalities can be distributed among the components in a different manner.

The allocation module 510 allocates and releases memory blocks in response to requests from the tool modules 420 and/or other modules within the data analytics application 160. The allocation module 510 receives allocation requests from other modules within the data analytics application 160 and allocates blocks of memory in response. The allocation request may be received, for example, from tools of the tool modules 420 while the tools are processing the workflow. The memory allocation module 510 allocates the blocks from a virtual pool of blocks that is made to appear infinite. These virtual blocks may be in the primary memory 140 or in the secondary memory 150, respecting the limits of the memory architecture. The blocks of memory allocated by the allocation module 510 are distinct from the secondary data blocks described with respect to the secondary memory 150.

Specifically, the allocation module 510 receives a memory allocation request, allocates a logical contiguous block of memory in response to the request, and returns a handle to the block of memory to the requestor. In some embodiments, the allocation request specifies a block size and the allocation module 510 allocates the block based on the block size. In one embodiment, the allocation module 510 allocates two different types of blocks: an uncompressed memory block and a compressed memory block. An uncompressed memory block holds uncompressed data records. A compressed memory block is smaller than an uncompressed memory block and holds compressed data records (i.e., one or more uncompressed memory blocks that have undergone compression). The memory allocation request received by the allocation module 510 specifies the type of memory block to allocate.

The allocation module 510 also receives memory release requests that specify handles to blocks of memory. The allocation module 510 releases such memory blocks so that the blocks are available to be reallocated in subsequent requests. The allocation module 510 keeps a list of free blocks that are available to be reallocated.

The compression module 520 selectively compresses and decompresses memory blocks when the primary memory usage exceeds or falls below a threshold. A compressed memory block occupies significantly less storage space than an uncompressed memory block. When used for compression, the compression module 520 is provided with the handle of an uncompressed memory block holding data records and stored in the primary memory 140. The compression module 520 compresses the data records in a memory block identified by the uncompressed memory block handle, and stores the compressed data records at a location identified by a compressed memory block handle. The compression module 520 returns the compressed memory block handle to the requestor. Note that both the uncompressed memory block and the compressed memory block remain in the primary memory 140 after the compression is performed. In one embodiment, the compression module 520 performs compression and decompression operations using dedicated, separate threads. This way, other threads executing on the data analytics system 110 are not blocked by the compression and decompression tasks.

The compression module 520 requests a compressed memory block handle from the allocation module 510 when it performs compression. The allocation module 510 allocates a new compressed memory block or returns a compressed memory block from the free list in response to the request. The compressed memory blocks may be smaller than the ready blocks, and the compression module 520 may use more than one compressed memory block to store the content of an uncompressed memory block.

For decompression, the compression module 520 receives a compressed memory block handle identifying a compressed memory block stored in the primary memory 140. The compression module 520 requests and receives one or more handles for uncompressed memory blocks from the allocation module 510 and decompresses the one or more compressed memory blocks into the allocated uncompressed memory blocks. Once decompression is performed, the compression module 520 either releases the compressed memory block or uses it to service a subsequent compression request.

The compression module 520 uses a lossless compression algorithm optimized for speed of compression, rather than an algorithm optimized for compression ratio. For example, the compression module 520 may use the Snappy compression algorithm to compress memory blocks. The compression module 520 may also use other compression algorithms, such as variations of Huffman coding and Lempel-Ziv compression.

The data transfer module 530 selectively moves data blocks between the primary 140 and secondary 150 memories in response to requests from other modules within the memory management module 430. In one embodiment, the data transfer module 530 moves compressed memory blocks between primary 140 and secondary 150 memories. The compressed memory blocks can be larger than the secondary data blocks used by the secondary memory 150. A compressed memory block can therefore occupy multiple secondary data blocks. The data transfer module 530 moves the secondary data blocks holding data from a same compressed memory block between the primary 140 and secondary 150 memories as a unit.

The memory control module 540 interacts with the other modules in the memory management module 430 to control the selective compression/decompression and transfer of memory blocks between the primary 140 and secondary memories 150. The memory control module 540 monitors requests by the tool modules 420 to access memory blocks as the tools process the workflow. The memory control module 540 ensures that any memory to which access is requested is stored in the primary memory 140 in an uncompressed state. Such blocks are referred to as being in the "ready" state.

If a requested memory block is not in the ready state, the memory control module 540 retrieves the memory block from the secondary memory 150 and/or decompresses the memory block into the primary memory 140 to bring the block into the ready state. In some embodiments, the memory control module 540 can speculatively compress, decompress, and transfer memory blocks to increase the likelihood that a given memory block is already in the ready state when a tool module 420 requests access to it.

To this end, the memory control module 540 determines the total amount of the primary memory 140 available to store memory blocks. As the workflow executes, the memory control module 540 tracks the amount of the primary memory 140 actually being used to store memory blocks and, by extension, also tracks the amount of primary memory free to store additional memory blocks. In addition, the memory control module 540 tracks the amounts of primary memory used to store memory blocks in the various different states.

If the amount of primary memory usage occupied by memory blocks in the ready state exceeds a specified limit, called the "ready state threshold," the memory control module 540 uses the compression module 520 to speculatively compress at least some memory blocks in the ready state into the "compressed" state. The ready state threshold is 80% of available primary memory 140 in one embodiment.

The memory control module 540 maintains both the compressed and the corresponding uncompressed memory blocks in the primary memory 140; the compressed memory blocks are ready for transfer to the secondary memory 150 if primary memory usage further increases. The uncompressed memory blocks in the primary memory 140 having corresponding compressed blocks also stored in the primary memory are referred to as being in the "ready and compressed" state. If a tool module 420 accesses a memory block in the ready and compressed state, the memory control module 540 may convert the memory block into the ready state by releasing (e.g., by recycling) the corresponding blocks in the compressed state. In one embodiment, the memory control module 540 converts the memory block into the ready state if a tool module 420 writes to the memory block, and serves the request by writing to the converted memory block in the ready state. If the tool module 420 reads from the memory block, the memory control module 540 may serve the read access using the memory block in the ready and compressed state while leaving the memory block in that state.

If the primary memory 140 usage continues to increase past the ready state threshold, the memory control module 540 releases at least some memory blocks in the ready and compressed state, thus freeing the primary memory occupied by these blocks. In one embodiment, if the primary memory 140 usage exceeds a release threshold which is greater than the ready state threshold, the memory control module 540 releases memory blocks in the ready and compressed state to make room for new allocations of memory blocks. In one embodiment the release threshold is 100% of primary memory. Thus, the memory control module 540 releases the memory blocks in the ready and compressed state once usage of primary memory reaches 100%.

In addition, the memory control module 540 makes space available in the primary memory 140 by transferring memory blocks in the compressed state to the secondary memory 150. In one embodiment, the memory control module 540 tracks the amount of the primary memory 140 occupied by memory blocks in the compressed state. If the memory blocks in the compressed state exceeds a threshold amount of primary memory (the "compressed" threshold), the memory control module 540 transfers at least some of the compressed blocks to the secondary memory 150 by writing the compressed blocks to secondary memory and releasing the primary memory 140 in which the blocks were stored. The memory blocks stored in the secondary memory 150 are referred to as being in the "on disk" state.

When usage of the primary memory 140 decreases, the memory control module 540 speculatively transfers memory blocks in the on disk state from the secondary memory 150 to primary memory. The memory control module 540 detects when usage of the primary memory falls below a usage threshold (or, conversely, when unallocated free space in the primary memory exceeds a threshold). In one embodiment the usage threshold is 50%. In response to the primary memory usage falling below the usage threshold, the memory control module 540 transfers at least some memory blocks in the on disk state to the primary memory 140.

These transferred memory blocks are stored in the primary memory 140 in the compressed state. In addition, the memory control module 540 retains the transferred memory blocks in the secondary memory 150 in the on disk state. Thus, these memory blocks are simultaneously held in both the compressed and on disk states. If the primary memory 140 usage increases and, e.g., exceeds the compressed threshold, the memory control module 540 releases at least some of the compressed memory blocks having corresponding on-disk memory blocks. In this way, the primary memory 140 is recovered without needing to transfer the memory blocks from primary memory to the secondary memory 150. Likewise, if a tool module 420 accesses a memory block that is in both the compressed and on disk state, the memory control module 540 decompresses the compressed version of the memory block into the ready state, and releases the memory block in the on disk state.

An embodiment of the memory control module 540 performs the above-described operations on the memory blocks in orders based on when particular blocks were allocated and/or accessed by the tool modules 420. When converting blocks from the ready state to the ready and compressed state, the memory control module 540 compresses the most-recently allocated memory blocks first. Said another way, the memory control module 540 compresses the blocks in ascending order of elapsed time since allocation. The memory control module 540 also uses this order when moving compressed blocks to the secondary memory 150 (e.g., to the on disk state). The memory control module 540 uses this order because tools that perform multiple passes on the data records will tend to access a block upon allocation then not access it again until the second pass. Hence, the most recently-allocated blocks are compressed based on the assumption that blocks allocated less recently will be accessed before the more-recently allocated blocks.

When transferring memory blocks from the secondary memory 150 to the primary memory 140, the memory control module 540 uses an order based on when the memory blocks were transferred to the secondary memory 150 (i.e., when the blocks were converted to the on disk state). An embodiment the memory control module 540 retrieves memory from the secondary memory 150 starting with the least-recent blocks. In other words, the memory control module 540 retrieves the blocks in descending order of elapsed time since the blocks were stored in the secondary memory 150. The memory control module 540 uses this order based on the assumption that the tool modules 420 will access older blocks before accessing newer blocks.

Figure 6:
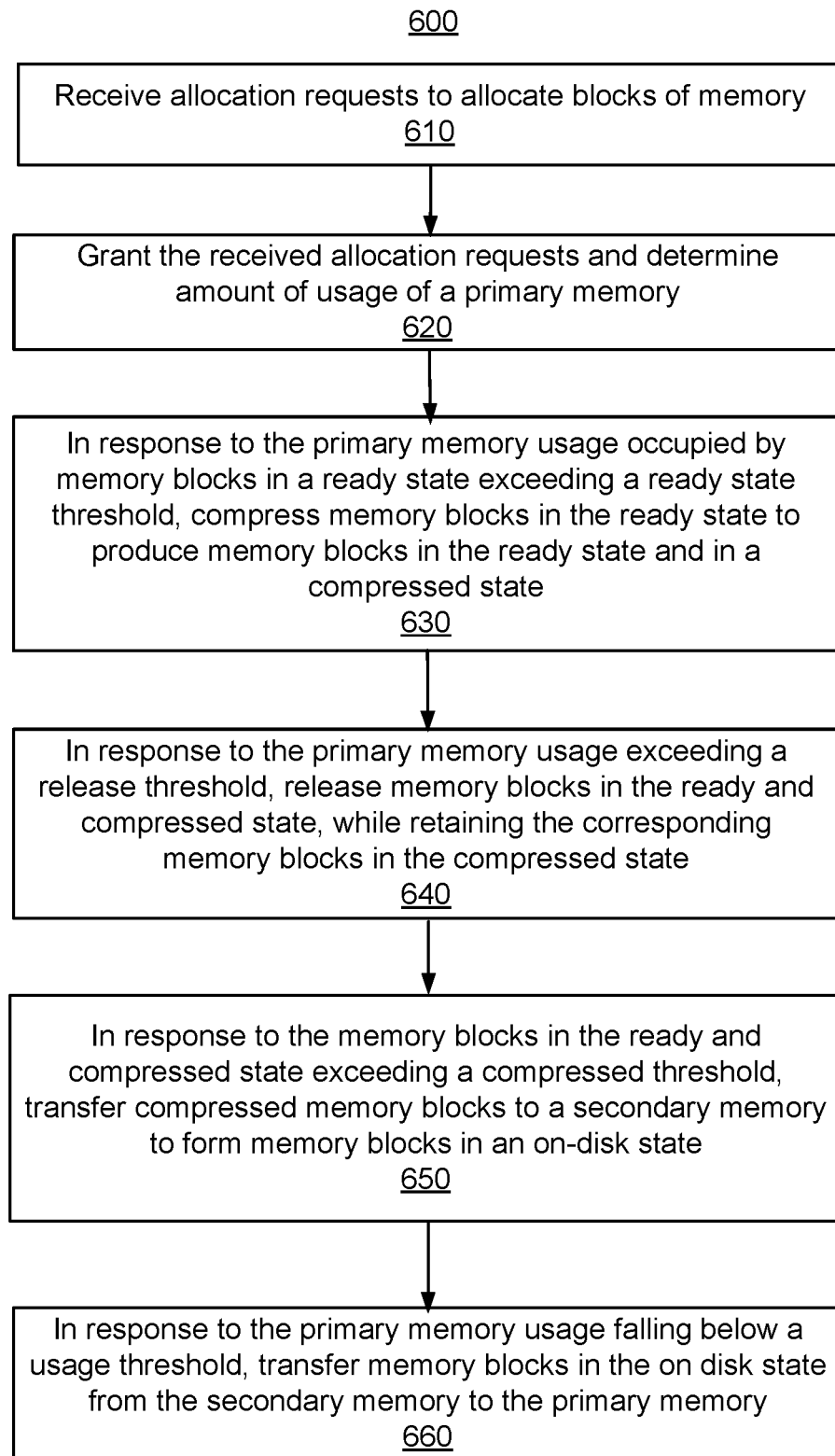
FIG. 6 is a flow chart illustrating a process of allocating memory within the data analytics application according to one embodiment.

FIG. 6 is a flow chart illustrating a process of allocating memory within the data analytics application according to one embodiment. In some embodiments, the method is performed by the memory control module 540, although some or all of the operations in the method may be performed by other entities in other embodiments. In some embodiments, the operations in the flow chart are performed in a different order and can include different and/or additional steps.

The memory control module 540 receives 610 allocation requests to allocate blocks of memory. The memory control module 540 grants 620 the received allocation requests and determines the amount of usage of the primary memory 140. For example, the memory control module 540 determines the amount of primary memory 140 occupied by memory blocks in the ready state and memory blocks in the compressed state. In response to the primary memory usage exceeding the ready state threshold, the memory control module 540 compresses 630 memory blocks in the ready state to produce memory blocks in the ready and compressed state and in the compressed state. In response to the primary memory usage exceeding the release threshold, the memory control module 540 releases 640 memory blocks in the ready and compressed state, while retaining the corresponding memory blocks in the compressed state.

In response to the memory blocks in the compressed state exceeding a compressed threshold, the memory control module 540 transfers 650 the compressed memory blocks to the secondary memory 150 to form blocks in an on disk state. Those compressed memory blocks may be held in both the compressed state and on disk state. If the available primary memory 140 increases, e.g., exceeds the compressed threshold, the memory control module 540 can release one or more of the compressed memory blocks having corresponding on disk memory blocks from the primary memory 140.

In response to the primary memory usage falling below a usage threshold, the memory control module 540 transfers 660 memory blocks in the on disk state from the secondary memory 150 to the primary memory 140. These memory blocks may be maintained in both the on disk state and the compressed state.

Figure 7:
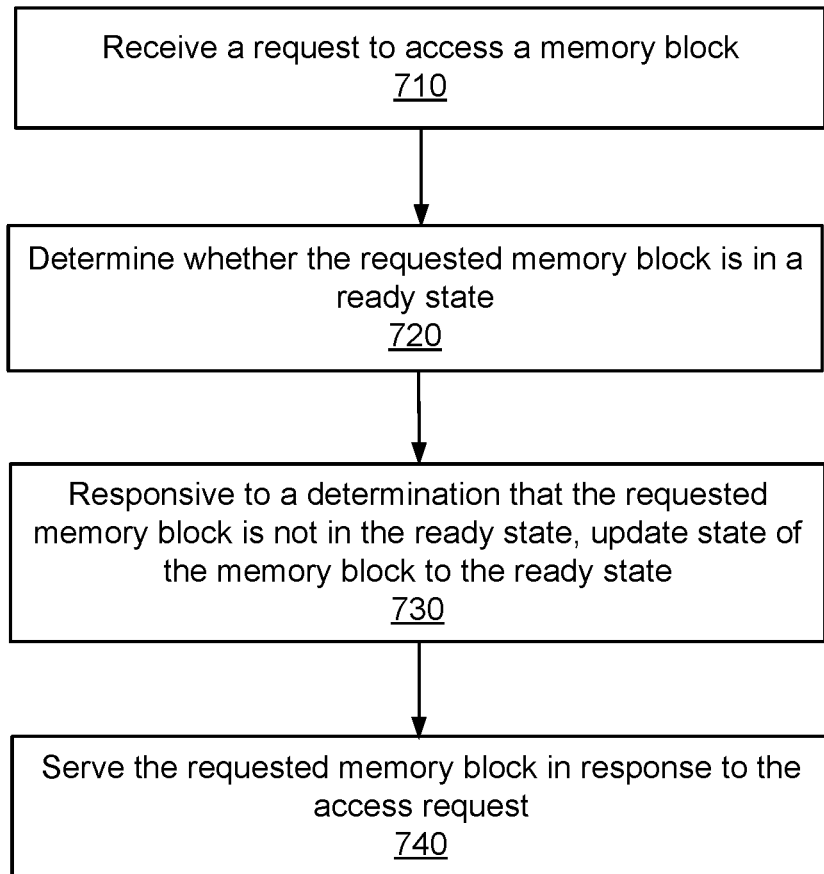
FIG. 7 is a flow chart illustrating a process of serving a data block to a tool module requesting access to the data block according to one embodiment.

FIG. 7 is a flow chart illustrating a process of serving a memory block to a tool module 420 requesting access to the memory block according to one embodiment. In some embodiments, the method is performed by the memory control module 540, although some or all of the operations in the method may be performed by other entities in other embodiments. In some embodiments, the operations in the flow chart are performed in a different order and can include different and/or additional steps.

The memory control module 540 receives 710 a request to access a memory block. The request, in some instances, is made by a tool module 420. In some embodiments, the memory control module 540 determines 720 whether the requested block is in a ready state. The requested memory block is in the ready state when it is stored in the primary memory 140 in an uncompressed state.

Responsive to a determination that the requested memory block is not in the ready state, the memory control module 540 updates 730 state of the requested memory block to the ready state. For example, the memory control module 540 decompresses the requested memory block upon a determination that the requested memory block is in a compressed state. As another example, the memory control module 540 transfers the requested memory block from the secondary memory 150 to the primary memory 140 upon a determination that the requested memory block is stored in the on disk state. When the memory control module 540 determines that the requested memory block is in the ready state, the memory control module 540 does not change state of the requested memory block and can proceed to perform the next step. The memory control module 540 then serves 740 the requested memory block in response to the access request. For example, the memory control module 540 sends the requested memory block to the tool module 420 that made the access request.

In another embodiment, upon receiving a read access request for a memory block in the ready and compressed state, the memory control module 540 serves the request using the version of the memory block in the ready and compressed state (i.e., the uncompressed version of the block), and leaves the version of the memory block in the compressed state in primary memory. This way the request is satisfied and the work performed to compress the memory block is retained.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer-implemented method of managing memory in a computer comprising:
monitoring usage of a primary memory associated with the computer, the primary memory storing uncompressed memory blocks in a ready state;
in response to primary memory usage by the uncompressed memory blocks in the ready state exceeding a ready state threshold,
compressing at least some of the uncompressed memory blocks in the ready state to form compressed memory blocks,
storing the at least some of the uncompressed memory blocks as memory blocks in a ready and compressed state in the primary memory, and
storing the compressed blocks as memory blocks in a compressed state in the primary memory;
in response to primary memory usage by the memory blocks in the ready and compressed state exceeding a release threshold, releasing at least some of the memory blocks in the ready and compressed state; and
in response to primary memory usage by the memory blocks in the compressed state exceeding a compressed threshold, transferring at least some memory blocks in the compressed state to a secondary memory associated with the computer to form memory blocks in an on disk state.

2. The method of claim 1, further comprising:
receiving a request from a module executing on the computer to access a memory block;
determining whether the requested memory block is in the ready state; and
responsive to a determination that the requested memory block is not in the ready state, changing the requested memory block into the ready state; and
serving the requested memory block in the ready state in response to the access request.

3. The method of claim 1, further comprising:
in response to primary memory usage falling below a usage threshold, transferring at least some memory blocks in the on disk state from the secondary memory to the primary memory.

4. The method of claim 3, wherein the memory blocks transferred from the secondary memory to the primary memory are stored in the primary memory in the compressed state, further comprising:
retaining the transferred memory blocks in the on disk state on the secondary memory; and
in response to primary memory usage exceeding the compressed threshold, releasing the memory blocks transferred from the secondary memory to the primary memory stored in the compressed state.

5. The method of claim 1, further comprising:
receiving a request from a module executing on the computer to access a memory block in the ready and compressed state;
determining whether the access request is a read request or a write request;
responsive to determining that the access request is a write request:
changing the requested memory block into the ready state; and
releasing a memory block in the compressed state corresponding to the requested memory block;
responsive to determining that the access request is a read request:
serving the read request using the memory block in the ready and compressed state; and
maintaining the requested memory block in the ready and compressed state.

6. The method of claim 1, wherein compressing at least some of the uncompressed memory blocks in the ready state to form compressed memory blocks comprises:
compressing the uncompressed memory blocks in the ready state in an ascending order of elapsed time since allocation of the uncompressed memory blocks.

7. The method of claim 1, wherein the primary memory provides faster access to memory blocks relative to the secondary memory.

8. A computer system for managing memory in a computer, the system comprising:
a non-transitory computer-readable storage medium storing executable computer program instructions, the computer program instructions comprising instructions that when executed cause a computer processor to perform steps, comprising:

monitoring usage of a primary memory associated with the computer, the primary memory storing uncompressed memory blocks in a ready state;
in response to primary memory usage by the uncompressed memory blocks in the ready state exceeding a ready state threshold,
compressing at least some of the uncompressed memory blocks in the ready state to form compressed memory blocks,
storing the at least some of the uncompressed memory blocks as memory blocks in a ready and compressed state in the primary memory, and
storing the compressed blocks as memory blocks in a compressed state in the primary memory;
in response to primary memory usage by the memory blocks in the ready and compressed state exceeding a release threshold, releasing at least some of the memory blocks in the ready and compressed state; and
in response to primary memory usage by the memory blocks in the compressed state exceeding a compressed threshold, transferring at least some memory blocks in the compressed state to a secondary memory associated with the computer to form memory blocks in an on disk state.

9. The system of claim 8, wherein the steps performed by the computer processor further comprise:
receiving a request from a module executing on the computer to access a memory block;
determining whether the requested memory block is in the ready state; and
responsive to a determination that the requested memory block is not in the ready state, changing the requested memory block into the ready state; and
serving the requested memory block in the ready state in response to the access request.

10. The system of claim 8, wherein the steps performed by the computer processor further comprise:
in response to primary memory usage falling below a usage threshold, transferring at least some memory blocks in the on disk state from the secondary memory to the primary memory.

11. The system of claim 10, wherein the memory blocks transferred from the secondary memory to the primary memory are stored in the primary memory in the compressed state, wherein the steps performed by the computer processor further comprise:
retaining the transferred memory blocks in the on disk state on the secondary memory; and
in response to primary memory usage exceeding the compressed threshold, releasing the memory blocks transferred from the secondary memory to the primary memory stored in the compressed state.

12. The system of claim 8, wherein the steps performed by the computer processor further comprise:
receiving a request from a module executing on the computer to access a memory block in the ready and compressed state;
determining whether the access request is a read request or a write request;
responsive to determining that the access request is a write request:
changing the requested memory block into the ready state; and
releasing a memory block in the compressed state corresponding to the requested memory block;

responsive to determining that the access request is a read request:
serving the read request using the memory block in the ready and compressed state; and
maintaining the requested memory block in the ready and compressed state.

13. The system of claim 8, wherein compressing at least some of the uncompressed memory blocks in the ready state to form compressed memory blocks comprises:
compressing the uncompressed memory blocks in the ready state in an ascending order of elapsed time since allocation of the uncompressed memory blocks.

14. The system of claim 8, wherein the primary memory provides faster access to memory blocks relative to the secondary memory.

15. A non-transitory computer readable storage medium storing executable computer program instructions for managing memory in a computer, the computer program instructions comprising instructions that when executed cause a computer processor to:
monitor usage of a primary memory associated with the computer, the primary memory storing uncompressed memory blocks in a ready state;
in response to primary memory usage by the uncompressed memory blocks in the ready state exceeding a ready state threshold,
compressing at least some of the uncompressed memory blocks in the ready state to form compressed memory blocks,
storing the at least some of the uncompressed memory blocks as memory blocks in a ready and compressed state in the primary memory, and
storing the compressed blocks as memory blocks in a compressed state in the primary memory;
in response to primary memory usage by the memory blocks in the ready and compressed state exceeding a release threshold, release at least some of the memory blocks in the ready and compressed state; and
in response to primary memory usage by the memory blocks in the compressed state exceeding a compressed threshold, transfer at least some memory blocks in the compressed state to a secondary memory associated with the computer to form memory blocks in an on disk state.

16. The computer readable medium of claim 15, wherein the computer program instructions for managing memory in the computer further comprise instructions that when executed cause the computer processor to:
receive a request from a module executing on the computer to access a memory block;
determine whether the requested memory block is in the ready state; and
responsive to a determination that the requested memory block is not in the ready state, change the requested memory block into the ready state; and
serve the requested memory block in the ready state in response to the access request.

17. The computer readable medium of claim 15, wherein the computer program instructions for managing memory in the computer further comprise instructions that when executed cause the computer processor to:
in response to primary memory usage falling below a usage threshold, transfer at least some memory blocks in the on disk state from the secondary memory to the primary memory.

18. The computer readable medium of claim 17, wherein the memory blocks transferred from the secondary memory to the primary memory are stored in the primary memory in the compressed state, wherein the computer program instructions for managing memory in the computer further comprise instructions that when executed cause the computer processor to:
- retain the transferred memory blocks in the on disk state on the secondary memory; and
- in response to primary memory usage exceeding the compressed threshold, release the memory blocks transferred from the secondary memory to the primary memory stored in the compressed state.

19. The computer readable medium of claim 15, wherein the computer program instructions for managing memory in the computer further comprise instructions that when executed cause the computer processor to:
- receive a request from a module executing on the computer to access a memory block in the ready and compressed state;
- determine whether the access request is a read request or a write request;
- responsive to determining that the access request is a write request:
  - change the requested memory block into the ready state; and
  - release a memory block in the compressed state corresponding to the requested memory block;
- responsive to determining that the access request is a read request:
  - serve the read request using the memory block in the ready and compressed state; and
  - maintain the requested memory block in the ready and compressed state.

20. The computer readable medium of claim 15, wherein the computer program instructions for compressing at least some of the uncompressed memory blocks in the ready state to form compressed memory blocks comprise instructions that when executed cause the computer processor to:
- compress the uncompressed memory blocks in the ready state in an ascending order of elapsed time since allocation of the uncompressed memory blocks.

\* \* \* \* \*